US006121925A

United States Patent [19]

Hilliard

[11] Patent Number: 6,121,925

[45] Date of Patent: Sep. 19, 2000

[54] DATA-LINK AND ANTENNA SELECTION ASSEMBLY

[75] Inventor: Keith D. Hilliard, Athens, Ala.

[73] Assignee: The United States of America as represented by the Secretary of the Army, Washington, D.C.

[21] Appl. No.: 09/387,437

[22] Filed: Sep. 1, 1999

[51] Int. Cl.[7] ........................................................ G01S 5/04

[52] U.S. Cl. ............................. 342/432; 342/374; 455/83

[58] Field of Search .................................... 342/374, 432, 342/423, 428; 455/82, 83, 277.1, 277.2

[56] References Cited

U.S. PATENT DOCUMENTS

| | | | |
|---|---|---|---|
| 3,568,207 | 3/1971 | Boyns et al. | 343/754 |
| 4,451,831 | 5/1984 | Stangel et al. | 343/374 |
| 4,545,071 | 10/1985 | Freeburg | 455/33 |
| 4,604,626 | 8/1986 | Stromswold | 343/417 |
| 5,617,102 | 4/1997 | Prater | 342/374 |
| 5,841,816 | 11/1998 | Dent et al. | 375/331 |
| 6,006,113 | 12/1999 | Meredith | 455/562 |

*Primary Examiner*—Thomas H. Tarcza
*Assistant Examiner*—Dao L. Phan
*Attorney, Agent, or Firm*—Arthur H. Tischer; Freddie M. Bush; Hay Kyung Chang

[57] ABSTRACT

The data-link and antenna selection assembly combines a group of conformal antenna arrays with radio frequency (RF) detection, control and switching circuitry to provide up to 360 degrees of azimuth coverage for an aerial or terrestrial vehicle. The signal monitoring comprises signal detection and determination of signal frequency and strength. These are input to a switching controller which selects the best receive path and transmit path as a function of received signal frequency and strength. Use of conformal antenna arrays eliminates the requirement for cumbersome mechanical positioners.

7 Claims, 3 Drawing Sheets

DATA-LINK AND ANTENNA SELECTION ASSEMBLY

DEDICATORY CLAUSE

The invention described herein may be manufactured, used and licensed by or for the Government for governmental purposes without the payment to me of any royalties thereon.

BACKGROUND OF THE INVENTION

Unmanned aerial vehicles typically provide data-link communications through an airborne data terminal (ADT). The ADT usually consists of a transmitter, receiver and an antenna assembly. The antennas used are medium or high-gain directional antennas working in combination with omni-directional antennas. The directional antenna is normally a printed array or horn antenna which requires the use of a mechanical positioner to aim the antenna at a remote transmitting or receiving station. The positioning of the antenna is controlled by manipulating the positioner via the data-link control in accordance to either operator-commanded positions or azimuth-based positions calculated by using the data received from the Global Positioning System (GPS).

However, the mechanical positioners used to aim the directional antenna are large and heavy and are capable of only limited elevation coverage. Further, they need to be situated external to the aircraft body in order to provide full azimuth coverage and to avoid aircraft body obstructions. FIG. 1 illustrates a typical mounting position of airborne data terminal (ADT) 101 that includes a mechanical positioner on aerial vehicle 103. The external positioning of the ADT increases aircraft drag and, in some aircraft orientations, causes certain areas to have limited or obscured RF transmission or reception due to the aircraft body obstruction. Unmanned ground vehicles currently use similar structures though these rely mostly on low gain omni-directional antennas. If communications with multiple remote data terminals is desired, then multiple directional antennas must be used. This, in turn, increases the complexity of the required mechanical positioner as well as its control mechanism while continuing to suffer obscurations and drags.

SUMMARY OF THE INVENTION

A series of conformal antenna arrays, each array containing therein several antenna elements, is arranged on the outer surface of the vehicle (either aerial or terrestrial) so as to be able to cover jointly up to 360 degrees of azimuth around the vehicle. The detection and strength determination of received radio frequency (RF) signal and the selection of antenna arrays for subsequent transmission and reception of RF signals based upon the frequency and the strength of the received signal provides a data-link and antenna assembly that eliminates the need for a mechanical antenna positioner. Since conformal antennas may be mounted flush with the host surface, the location of individual antenna array can be chosen to obtain complete coverage in azimuth or elevation while avoiding beam obscuration and decreasing aircraft drag and providing antenna gain similar to medium gain antennas.

DESCRIPTION OF THE PREFERRED EMBODIMENT

Figure 1:
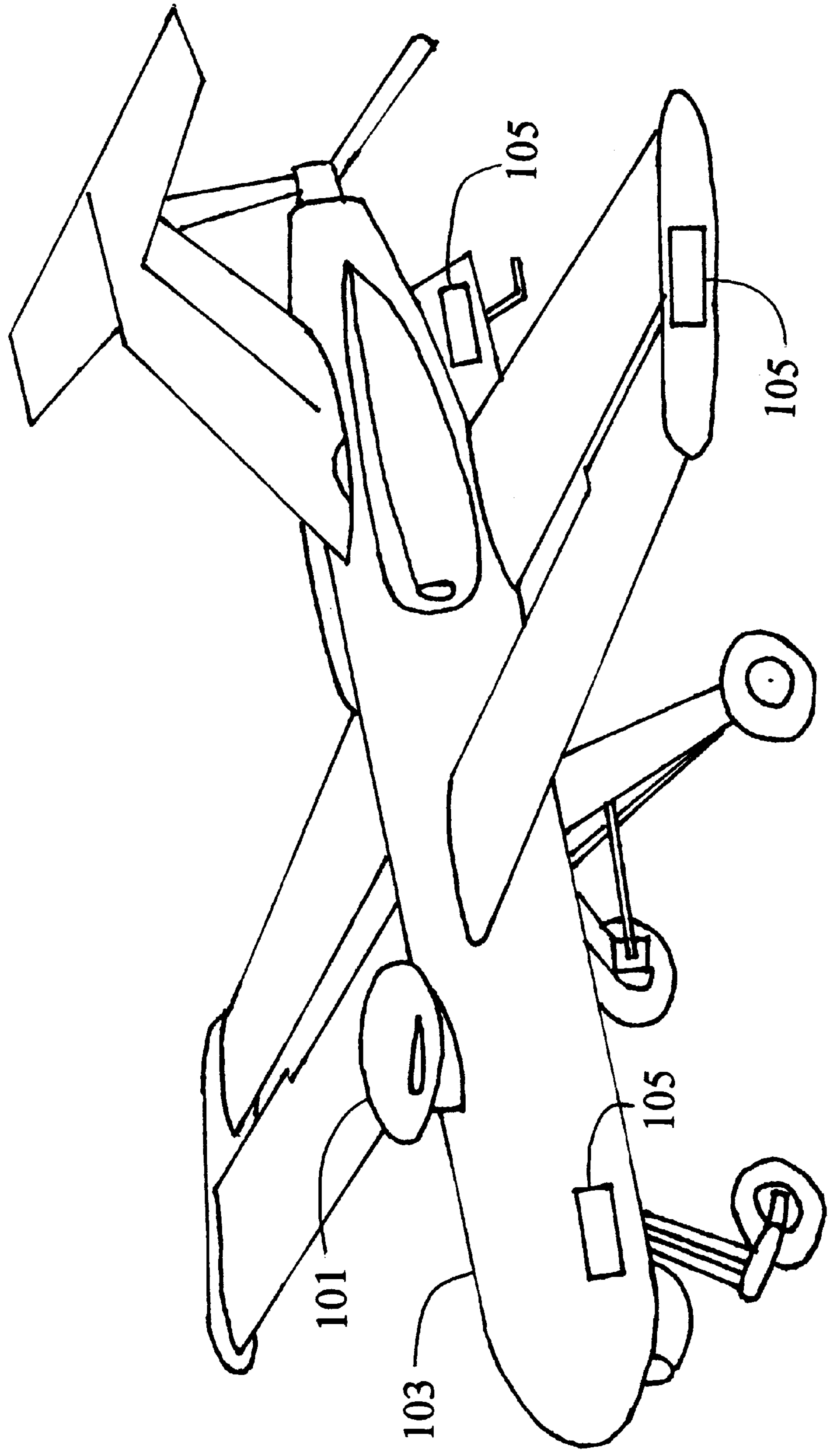
FIG. 1 illustrates the typical mounting position of an airborne data terminal having a mechanical positioner on an aerial vehicle.

Referring now to the drawing wherein like numbers represent like parts in each of the several figures, FIG. 1 shows some exemplar positions, on the outer surface of vehicle 103, of conformal antenna arrays 105 in accordance with the invention. The arrays are deployed in sufficient number and in suitable positions around the vehicle to provide jointly azimuth coverage of up to 360 degrees. Each of the antenna arrays, which are commercially available, is composed of a multiplicity of individual antenna elements arranged in rows. Varying the number of rows controls the degree of elevation coverage as does layering arrays along the elevation axis.

Figure 2:
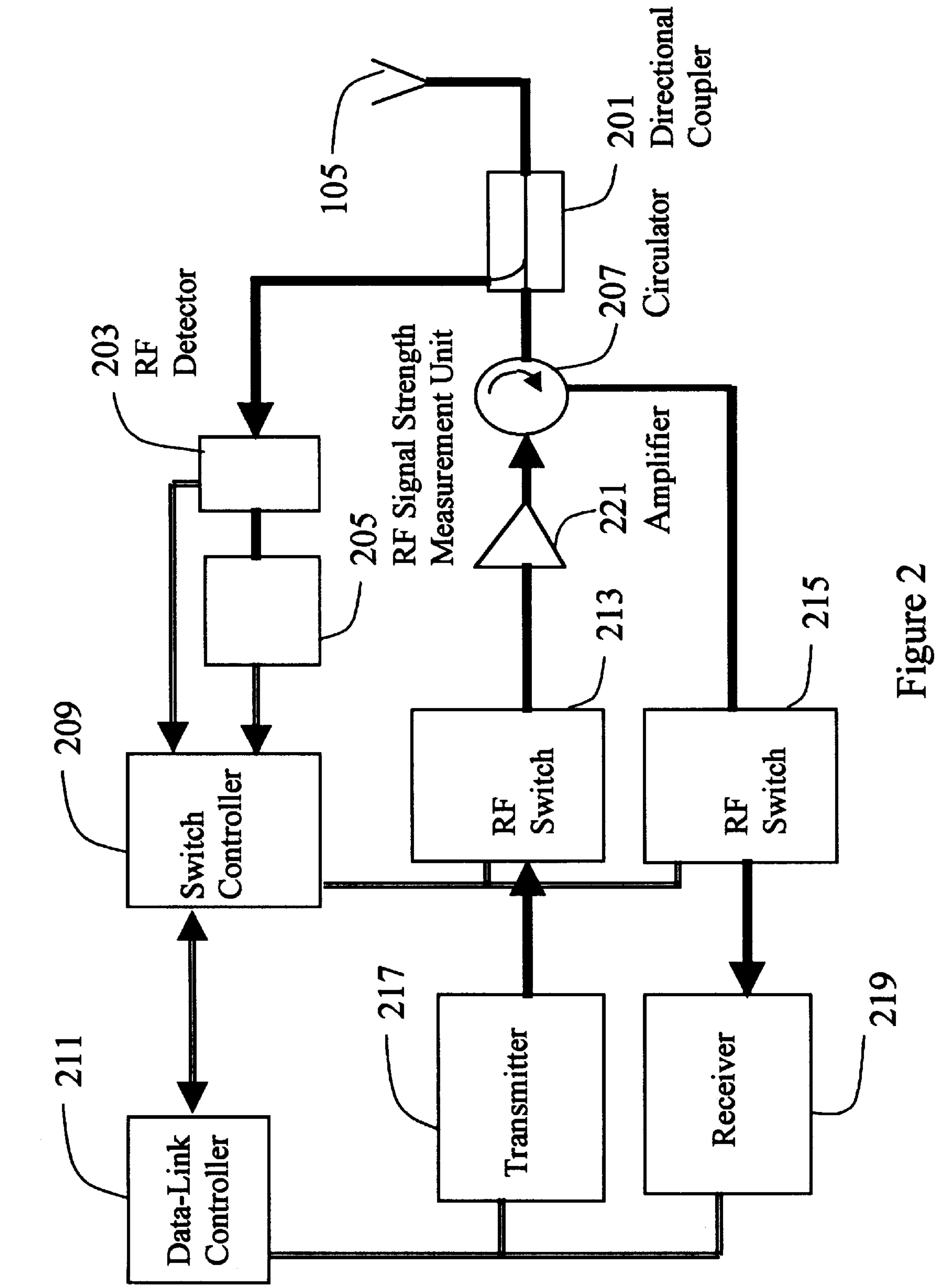
FIG. 2 depicts in detail the components and circuitry associated with a representative conformal antenna array 105.
Figure 3:
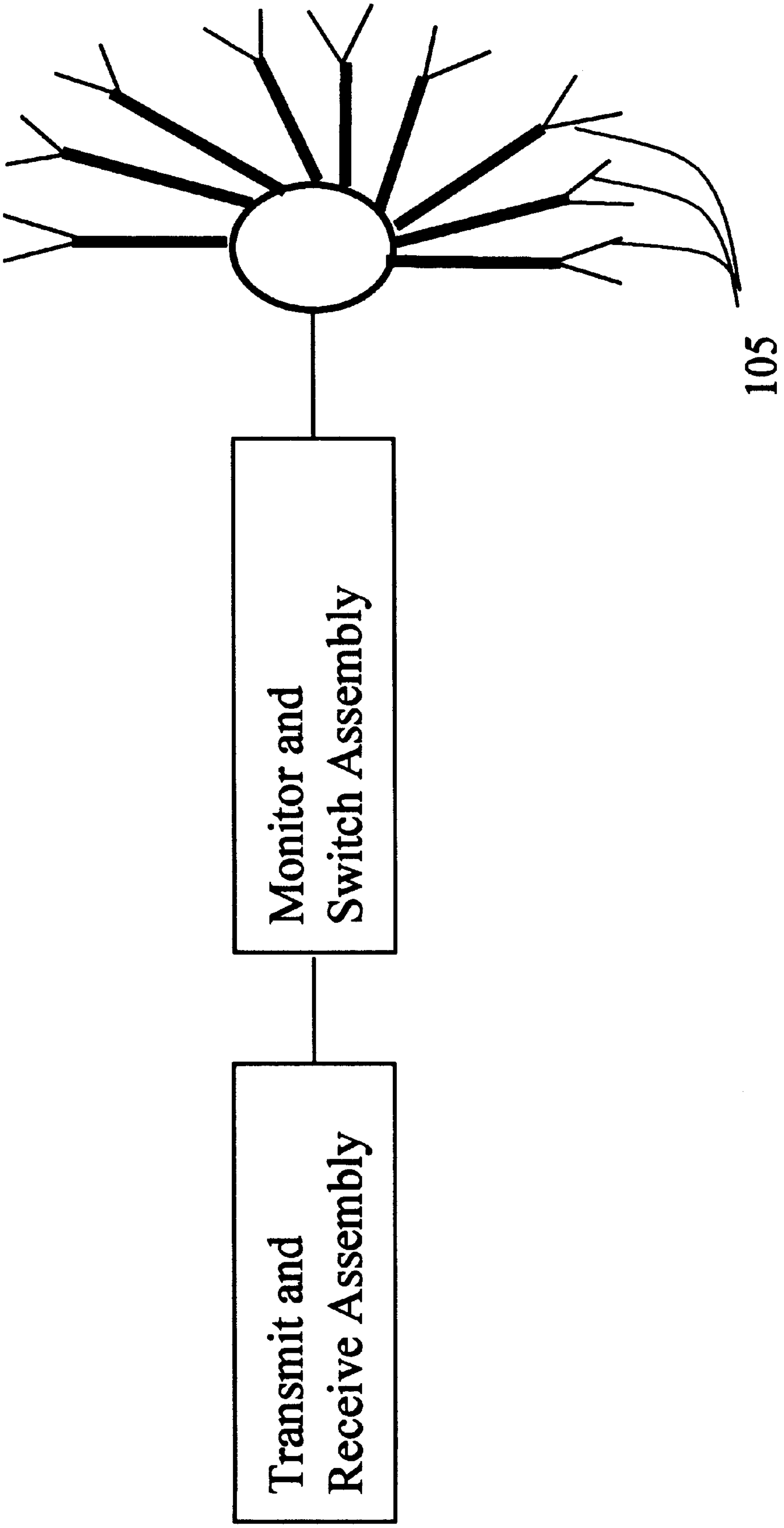
FIG. 3 illustrates a deployment pattern of antenna arrays sufficient for providing approximately 180 degrees of azimuth coverage.

FIG. 2 depicts in detail the components and circuitry associated, in accordance with the invention, with a representative conformal antenna array 105 which can be any of those illustrated in FIG. 3. It is noted here that even though FIG. 3 shows antenna allays sufficient for providing only approximately 180 degrees of azimuth, it is for illustrative purposes only and any number of antenna arrays can be arranged to provide any desired degree of azimuth since both the transmit-and-receive and switch functions are performed by components located inside the aircraft.

Reference is now made to FIG. 2 wherein solid line arrows indicate RF signal paths and double line allows indicate control/data paths. In a typical receive mode of the operation, a radio frequency (RF) signal is received by antenna 105 and a fraction thereof is coupled to switch controller 209 by directional coupler 201, RF detector 203 and strength measurement unit 205 which collectively may be referred to as the antenna monitor. To be more specific, the RF signal received by the antenna travels to directional coupler 201 which allows straight passage of the received signal to circulator 207 while coupling a small fraction of the signal to RF detector 203. The circulator routes the received signal to receiver 219 via second RF switch 215 which may be a RF multiplexer. The fractional signal that is sent to RF detector 203 is used to determine the absence or presence of any signal at all on antenna 105. If signal is present, then this fact is input to switch controller 209 and the fractional signal is input to strength measurement unit 205 which determines the strength of the RF signal that impinged on antenna 105. The strength measurement is also input to switch controller 209. It is envisioned that there is equality in the number of antenna monitors, antenna arrays and circulators and that the monitors and the antenna arrays are coupled to each other in a one-to-one correspondence as are monitors and the circulators. This means that the signal reception and processing as described above is performed simultaneously by all of the antenna arrays and monitors and a multitude of signal strength measurements as well as the information regarding absence or presence of signals on each of the arrays are input to switch controller 209 simultaneously. These inputs are shared with data-link controller 211 which is a computer that is adapted to set the operational frequencies of transmitter 217 and receiver 219, control the strength of the RF signals transmitted by the transmitter, determine the position of the host vehicle with respect to the position of the vehicle with which the host vehicle is communicating and also to determine, based on the inputs from the switch controller, which antenna array has the strongest signals at a pre-selected frequency. The switch controller co-operates with the data-link controller and selectively manipulates first and second RF switches 213 and 215, respectively, to change the subsequent transmit and receive paths to correspond to the antenna array that received maximum strength signal.

In response to the selection of a particular antenna array 105, emanation from transmitter 217 is suitably amplified by amplifier 221 and routed by the circulator 207 that corresponds to the selected antenna array to be transmitted outwardly by the selected antenna array.

Signals can be simultaneously transmitted to or received from multiple remote stations by selecting among the multiple input and output ports of first and second RF switches 213 and 215, respectively. The above-described data-link and antenna selection assembly may function as a backup to operator-commanded choice of transmit and receive antennas or to GPS coordinate-derived paths.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

I claim:

1. A data-link and antenna selection assembly for providing a pre-selected degree azimuth coverage, said assembly being mountable on a vehicle and comprising: a plurality of conformal antenna arrays, said arrays being positioned on the vehicle so as jointly to provide the pre-selected azimuth coverage, each of said arrays being adapted to receive and transmit RF signals and conforming to ant host surface on which said array is mounted; a transmitter; a receiver; a data-link controller coupled simultaneously to said transmitter and receiver, said data-link controller setting the functional frequencies of said transmitter and said receiver and controlling the strength of RF signals transmitted by said transmitter; a means for selecting the antenna array having the largest signal strength; and a means for implementing subsequent transmission and reception of RF signals via said antenna array having the largest signal strength.

2. A data-link and antenna selection assembly as set forth in claim 1, wherein said selecting means comprises a switch controller coupled between said data-link controller and said antenna arrays, said switch controller receiving RF signals from said antenna arrays and, in response to said received RF signals, determining the antenna array having the largest signal strength at a pre-selected frequency.

3. A data-link and antenna selection assembly as set forth in claim 2, wherein said implementing means comprises a first RF switch coupled to said transmitter; a second RF switch coupled to said receiver, said switches being further coupled to said switch controller and co-operating with said switch controller to choose the antenna array having the largest signal strength and using said chosen antenna array as subsequent transmit and receive path.

4. A data-link and antenna selection assembly as set forth in claim 3, wherein said assembly further comprises a plurality of antenna monitors, each monitor being coupled simultaneously between said first and second RF switches, said switch controller and one of said antenna arrays such that there is one-to-one correspondence between said monitors and said antenna arrays, each of said monitors receiving and processing the RF signals impinging on said corresponding antenna array; and a plurality of circulators, each of said circulators being coupled between said switches and one of said monitors for selectively routing RF signals between said corresponding antenna array and said switches.

5. A data-link and antenna selection assembly as set forth in claim 4, wherein each of said monitors comprises a RF detector for detecting the receipt of RF signals by said corresponding antenna array, said detector being coupled between said switch controller and said corresponding antenna array; a power measuring unit coupled between said switch controller and said RF detector, said measuring unit measuring the strength of any RF signals received by said corresponding antenna array and inputting the measurement to said switch controller; a directional coupler simultaneously coupled between said RF detector, said corresponding antenna array and said circulator, said coupler transmitting any RF signal received by said corresponding antenna array to said circulator while routing a sample of said received RF signal to said RF detector.

6. A data-link and antenna selection assembly as set forth in claim 5, wherein said assembly still further comprises an amplifier coupled between said first RF switch and said circulators, said amplifier amplifying any RF signal emanating from said transmitter.

7. A data-link and antenna selection assembly, said assembly being mountable on a vehicle and capable of providing up to a 360-degree azimuth coverage, said assembly comprising: a plurality of conformal antenna arrays, said arrays being distributed around the vehicle so as to provide together up to a 360-degree azimuth coverage around the vehicle, each of said arrays containing therein several antenna elements adapted to receive and transmit RF signals, said antenna array conforming to any host surface on which said array is mounted; a receiver; a transmitter; a data-link controller coupled simultaneously to said receiver and transmitter, said data-link controller setting the functional frequencies of said receiver and transmitter; a switch controller coupled between said data-link controller and said antenna arrays, said switch controller receiving RF signals from said antenna arrays and, in response to said received RF signals, determining the antenna array that has the largest signal strength at a pre-selected frequency; a first RF switch coupled to said transmitter; a second RF switch coupled to said receiver, said switches being further coupled to said switch controller and co-operating therewith to choose the antenna array having the largest signal strength and using said chosen antenna array as subsequent transmit and receive path; and a plurality of antenna monitors, each monitor being coupled simultaneously between said first and second RF switches, said switch controller and one of said antenna arrays such that there is one-to-one correspondence between said monitors and said antenna arrays, said monitor selectively routing RF signals between said switches, switch controller and corresponding antenna array.

* * * * *